United States Patent [19]

Yoshitomi et al.

[11] Patent Number: 4,743,502

[45] Date of Patent: May 10, 1988

[54] MAGNETO-OPTICAL MEDIUM

[75] Inventors: Toshihiko Yoshitomi, Yokohama; Yoshimitsu Kobayashi, Tokyo; Jun Sasaki, Machida; Yukio Watanabe, Yokohama, all of Japan

[73] Assignee: Mitsubishi Chemical Industries Limited, Tokyo, Japan

[21] Appl. No.: 883,817

[22] Filed: Jul. 9, 1986

[30] Foreign Application Priority Data

Jul. 10, 1985 [JP] Japan .................. 60-151506

[51] Int. Cl.$^4$ .............................. G11B 7/24
[52] U.S. Cl. .................... 428/336; 428/469; 428/472; 428/694; 428/704; 428/900
[58] Field of Search ............. 428/694, 900, 336, 469, 428/472, 704; 365/122; 369/13, 288; 360/131, 134

[56] References Cited

U.S. PATENT DOCUMENTS

| | | | |
|---|---|---|---|
| 4,268,575 | 5/1981 | Shinozaki et al. | 428/463 |
| 4,414,650 | 11/1983 | Ohta et al. | 365/122 |
| 4,449,138 | 5/1984 | Ando | 346/135.1 |
| 4,461,807 | 7/1984 | Mori et al. | 428/471 |
| 4,562,105 | 12/1985 | Machida et al. | 428/215 |
| 4,569,881 | 2/1986 | Freese et al. | 428/213 |
| 4,578,322 | 3/1986 | Sawamura et al. | 428/900 |
| 4,579,777 | 4/1986 | Honguu et al. | 428/693 |
| 4,586,092 | 4/1986 | Martens et al. | 365/59 |

FOREIGN PATENT DOCUMENTS

| | | |
|---|---|---|
| 3500314 | 7/1985 | Fed. Rep. of Germany . |
| 54056 | 3/1984 | Japan . |
| 197964 | 10/1985 | Japan . |
| 202559 | 10/1985 | Japan . |
| 2143689 | 2/1985 | United Kingdom . |

OTHER PUBLICATIONS

Cuomo et al. "Antireflection Coatings for the Enhancement of Magneto-Optic Effects in Amorphors Rare-Earth-Transition Metal Alloys" IBM TDB, vol. 16, No. 5, Oct. 1973, p. 1442.

Primary Examiner—George F. Lesmes
Assistant Examiner—William M. Atkinson
Attorney, Agent, or Firm—Oblon, Fisher, Spivak, McClelland & Maier

[57] ABSTRACT

Disclosed herein is a magneto-optical medium comprising a magnetic layer, a protective layer of a complex oxide containing oxides of aluminum and a base plate.

7 Claims, 3 Drawing Sheets

MAGNETO-OPTICAL MEDIUM

BACKGROUND OF THE INVENTION

The present invention relates to a magneto-optical medium suitable for magneto-optical recording, etc., and more in detail, relates to a magneto-optical medium comprising a magnetic layer, a protective layer of a complex oxide containing aluminium oxide and a base plate.

Among the optical memory elements, as an erasable type memory which can add or erase the record, a magneto-optical recording system is highly practicable.

As the medium for the magneto-optical recording system, an alloy thin film comprising rare earth element(s) and transition metal(s) is most excellent from the view point of the all-around memory properties. However, an alloy thin film comprising rare earth element(s) and transition metal(s), has a fatal defect in that such a thin film is poor in corrosion-resistance.

Namely, since such an alloy thin film comprising rare earth element(s) and transition metal(s) is poor in corrosion-resistance, the film causes, accompanying with the progress of corrosion thereof, the reduction of magnetic cohesive force which is the necessary condition of the high density recording, the reduction of the Kerr rotation angle which is the necessary condition of the high S/N ratio and the increase of the error rate.

Heretofore, in order to improve the corrosion-resistance of the film, the following two methods have been adopted:

(1) to improve the corrosion-resistance by adding an additive agent to magnetic layer and (2) to form a protective layer for improving the corrosion-resistance.

Of those two methods, in the method of using a protective layer for improving the corrosion-resistance, at first, a protective layer of an oxide of high melting point such as $Al_2O_3$, etc. has been proposed, because these oxides are low in reactivity to Tb, Fe, etc., and they are low in reactivity at the interface.

Namely, since the reactivity of the interface between the magnetic layer and the protective layer is low (Generally, an oxygen emited from the oxide often reacts with Tb etc., however, in the case where the oxide is $Al_2O_3$, such a reaction is substantially reduced since a bond between aluminum and oxygen is strong.), the deterioration of the magnetic layer is low and accordingly the protective layer of the oxide of high melting point is preferable.

However these oxides have a disadvantage of forming cracks, in the case of forming a layer on a plastic base plate. In addition, these oxides have faults that they are low in anti-moisture property resulting in forming smear-like spots on their surface exposed to a wet atmosphere under a high humidity and making the incidence of the read/write laser beam thereinto difficult, and as the results, the optical characteristic are degraded.

Furthermore, it has been elucidated that as the protective layer other than the above-mentioned oxide, since the layer of nitrides such as AlN and $Si_3N_4$ and the layer of fluorides such as $MgF_2$, $CeF_3$, etc. do not contain oxygen, such a layer has a favorable protecting characteristic. However, for these protective layers problems have been pointed out that (1) the layer of nitrides is high in thermal conductivity and the leakage of heat is large at the time of laser irradiation to the recording medium, (2) the adhesion force between the nitride layer and the magnetic layer is weak, and (3) the floride layer is difficult to form the film structure dense enough to protect the penetration of the oxygen and/or water.

Also, in the magneto-optical medium comprising the base plate such as glass, metal, plastic etc. and magnetic layer, in the case of using the plastic such as acrylic layer, polycarbonate resin, etc. as the base plate, it has been pointed out that (1) an affinity of the base plate and the magnetic layer is inferior, and as a results the cracks are formed and/or the exfoliation occurs, and (2) the deterioration of the magnetic layer occurs by a small amount of air, water etc. which are contained in the base plate or are penetrated through the base plate. Accordingly, the protective layer is required that (1) the affinity of the protective layer and the base plate or the magnetic layer is high, (2) water, air etc. are not penetrated, and (3) the protective layer per se is not deteriorated by water, air etc.

Further, in the case where the protective layer is placed between the base plate and the magnetic layer (the protective layer is placed on the surface of the magnetic layer, of which an incident bean are irradiated), it is desirable that the transparency of the protective layer is necessary so far as the incident beam reach enough the magnetic layer and a material of the protective layer has a high refractive index in order to improve the sensitivity of the magneto-optical medium at reading.

Accordingly, as a result of the present inventors' studies on the protective layer with the objective of improving the above-mentioned demerits of the hitherto proposed protective layers while paying their attention to the non-reactivity of $Al_2O_3$ at the interface, it is found that a protective layer comprising a complex oxide containing aluminum oxide solves the above-mentioned problems, and based on the finding, the present invention has been attained.

Namely, the objective of the present invention is to provide a protective layer which has the non-reactivity with the magnetic layer at the interface, an excellent affinity to the base plate of plastic such as acrylic resin, polycarbonate resin, etc., a low heat-conductivity and a high refractive index, and which is not deteriorated by water, air, etc. and is readily formed.

SUMMARY OF THE INVENTION

In the aspect of the present invention there is provided a magneto-optical medium comprising a magnetic layer, a protective layer of a complex oxide containing aluminum oxide and a base plate.

BRIEF EXPLANATION OF DRAWING

Of the attached drawing.

DETAILED DESCRIPTION OF THE INVENTION

Figure 1:
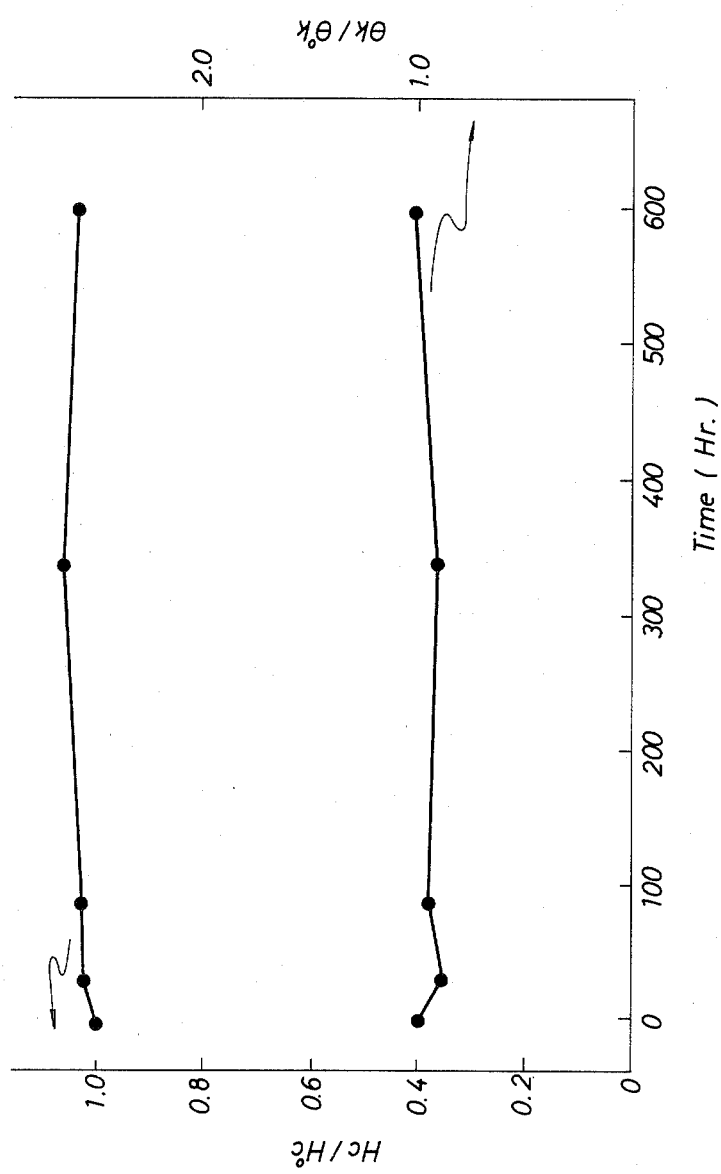
FIGS. 1 and 3 show $H_c/H_c^0$ and $\theta_k/\theta_k^0$ of the change with the passage of time of the media obtained respectively in Examples 1 and 2, wherein $H_c^0$ and $\theta_k^0$ represents, respectively cohesive force ($H_c$) and Kerr rotation angle ($\theta_k$) at the time of the beginning.

As the base plate used according to the present invention, glass, plastic such as acrylic resin, polycarbonate resin, etc. or metal such as aluminum, etc. may be mentioned.

Particularly, in the case of using acrylic resin or polycarbonate resin as the base plate, remarkable effects of the protective layer of the present invention are exhibited. The thickness of the base plate of the present invention is generally from about 1 mm to about 2 mm.

As the magnetic layer deposited on the base plate, an amorphous magnetic alloy layer of rare earth element(s) and a transition metal(s), for instance, TbFe, TbFeCo, TbCo, etc. or a layer of polycrystalline vertically-magnetized substance such as MnBi, MnCuBi, etc. is used (Particularly, in the case of using the amorphous magnetic alloy layer of the rare earth element(s), the remarkable effect thereof is exhibited remarkably.) and the thickness of the magnetic layer is generally from 50 to 3000 Å.

According to the present invention, the protective layer of a complex oxide containing aluminum oxide is disposed between the base plate and the magnetic layer, or the magnetic layer is disposed between the base layer and the protective layer of a complex oxide containing aluminum oxide.

As the complex oxide, a mixture and/or a solid solution of the aluminum oxide and an oxide of a metal selected from the group consisting of metals of 5A Group of Periodic Table according to IUPAC such as tantalum oxide, niobium oxide, etc.; metals of 4A and 4B Groups of Periodic Table according to IUPAC such as silicon oxide, titanium oxide, zirconium oxide, etc.; metals of 6A Group of Periodic Table according to IUPAC such tungsten oxide, molybdenum oxide, etc.; and rare earth elements such as ytterbium oxide, yttrium oxide, and cesium oxide.

The mixing ratio of the above-mentioned oxides to the aluminum oxide depends on the kind of oxides, and the mixture may contain (1) the metal oxide of 5A Group metal such as titanium oxide, niobium oxide, etc. in an amount of 3 to 80 mol%, preferably 10 to 50 mol%, (2) the metal oxide of 4A group metal such as zirconium oxide, titanium oxide, etc. in an amount of 20 tp 95 mol%, preferably 30 to 70 mol% (3) the metal oxide of 4B group metal such as silicon oxide, etc. in an amount of 5 to 60 mol% preferably 10 to 50 mol%, (4) the metal oxide of 6A Group metal such as tungsten oxide, molybdenum oxide, etc. in an amount of 5 to 80 mol%, preferably 10 to 60 mol% or (5) the oxide of a rare earth element such as ytterbium oxide, yttrium oxide, cesium oxide, etc. in an amount of 5 to 80 mol%, preferably 10 to 60 mol%.

Furthermore, the complex oxide according to the present invention may contain two or more kinds of oxides other than the aluminum oxide.

In the case of preparing the complex oxide according to the present invention, a known method such as an ordinary physical vapour deposition method (PVD), a chemical vapour deposition method (CVD) such as plasma CVD, a coating method using a liquid phase such as alkoxide, for instance, spincoating method, etc., which are described as follows, can be used.

(1) The protective layer of the present invention can be deposited by electron beam deposition or by sputtering using the sintered target source of the complex oxide. (2) The target of the aluminum oxide and other oxide can be used separately for co-sputtering method or the target composed of the aluminum oxide, and the chips of other oxide can be used as the target for sputtering. (3) A method of metal target by reactive ion-plating or reactive sputtering, or a method of using sub-oxides as the target may be used.

The thickness of the thus prepared protective layer is 10 to 5000 Å, preferably 100 to 2000 Å.

In the case where the composite oxide according to the present invention is more rapidly deposited on the base plate, the affinity of the thus obtained protective layer and the base plate becomes lower and on the other hand, in the case of being more slowly deposited, the productivity of the magneto-optical medium according to the present invention becomes lower. Accordingly, a suitable deposition rate is 0.1 to 100 Å/sec., preferably 1 to 10 Å/sec.

Usually, the magneto-optical memory media comprise the disk base plate and the magnetic layer. The read/write laser beam is usually brought through the transparent base disk plate. The protective layer of the present invention is disposed (sandwiched) between the base plate and the magnetic layer in order to avoid the penetration of oxygen and/or water which causes the degradation (oxidation) of the magnetic layer.

In the case of using glass as the base plate, since oxygen and/or water almost never penetrate through the base plate, the magnetic layer may be disposed (sandwiched) between the protective layer and the base layer.

In the case of using plastic such as acrylic resin, polycarbonate resin, etc. as the base plate, since oxygen and/or water would penetrate through the base plate, the protective layer is to be disposed (sandwiched) between the magnetic layer and the base layer.

In the case of depositing each of the protective layer, magnetic layer and another protective layer in order on the base plate, as another protective layer other than the protective layer of complex oxide according to the present invention, a layer of a nitride such as NB, $Si_3N_4$, TiN, ZrN, NbN, TaN, etc., a carbide such as TiC, NbC, TaC, SiC, etc. or a silicide such as $TaSi_2$, $CrSi_2$, $CoSi_2$, $VSi_2$, $TiSi_2$, etc. may be used. Also, the protective layer of complex oxide according to the present invention can be used as another protective layer.

Namely, as the structural construction of the magneto-optical medium according to the present invention, for example, (1) magnetic layer/protective layer/base plate, (2) protective layer/magnetic layer/base plate, (3) protective layer/magnetic layer/protective layer/base plate, (4) another protective layer/magnetic layer/protective layer/base plate and (5) protective layer/magnetic layer/another protective layer/base plate may be mentioned.

The magneto-optical medium having the above-mentioned composition may be used for the other device than the magneto-optical memory, which utilizes the magneto-optical effect, for instance, optical-isolators.

The generation of cracks at the time of preparing the film of the magneto-optical medium according to the present invention or under the high humidity is prevented and accordingly, the magneto-optical medium of the present invention has favorable properties.

The present invention will be explained more in detail while referring to the non-limitative Examples as follows.

EXAMPLE 1

(1) Preparation of a target

After weighing the raw material powder ($Al_2O_3$ and $Ta_2O_5$ of more than 99.9% purity), the raw material was dispersed in ethanol. After mixing the thus formed ethanolic dispersion by ball-milling, the thus treated material was dried at a temperature of 60° to 70° C., molded by a press under a pressure of 200 kg/cm² and then sintered for 10 hours in air at 1000° C. to obtain a target.

(2) Formation of layer

On a base plate, a protective layer of 1000 Å in thickness, a magnetic layer of Tb or TbFe of 500 Å in thickness and a protective layer of 1000 Å in thickness were vapour-deposited by electron beam in order, the respective background pressure in vapour coating being $9.9 \times 10^{-6}$ Torr for the protective layer, and $9.9 \times 10^{-7}$ Torr for the magnetic layer, and the respective vapour deposition rate being 5 Å/sec for the protective layer and 10 Å/sec for the magnetic layer.

In addition, the composition ratio of TbFe (Tb:Fe) was 3:7 in the volume ratio of the layer.

(3) Evaluation

The thus prepared media were examined by optical microscope and X-ray diffraction analysis and the light transmissivity (800 nm) of the media just after the preparation thereof, and the deterioration of the media was traced while keeping the media in a thermostat at 70° C. and 80% RH with the passage of time. It is considered that the lower the transmissivity, the smaller is the deterioration.

In addition, the Tb layer per se does not show magnetic, but terbium is one of the components of the magnetic layer. Since terbium deteriorates rapidly, the transmissivity of the medium changes remarkably due to the formation of terbium oxide by the deterioration.

Accordingly, by determination of the deterioration degree of the Tb layer with the passage of time, an effect of the protective layer is observed. Therefore, as reference example, a medium produced by depositing the composite oxide according to the present invention on the Tb layer is used.

The transmissivity of the medium comprising Tb layer and the protective layer immediately after the medium is produced is defined as unit, the deterioration degree thereof is measured by comparing with the transmissivity of the medium after the accelerating deterioration test.

For reference, in the protective layer of Al₂O₃-Ta₂O₅ series, the target compositions were Al₂O₃, Al₂O₃-Ta₂O₅(20:1), Al₂O₃-Ta₂O₅(5:1), Al₂O₃-Ta₂O₅(1:2) or Ta₂O₅. Each protective layer deposited on Tb layer or TbFe layer on a polycarbonate (PC) base plate (thickness: 1.2 μm) was kept for 1000 hours in a thermostat at 70° C. and 85% RH, and the results are shown in Table 1.

The value of T/To is the transmissivity ratio of the medium just after the preparation thereof to the transmissivity of the same medium after keeping for 1000 hours in a thermostat at 70° C. and 85% RH.

In addition, since the Tb layer is crystalline, the formation of oxide(s) of Tb due to deterioration can be evaluated also by X ray diffraction analysis.

Further, by keeping the degree of vacuum and the thickness of the vapour-deposited membrane at the time of preparing the layer to constant, it is possible to prepare the layer with a favorable reproducibility and accordingly, the data of Tb are shown in Table 1 in addition to the data of TbFe.

TABLE 1

| Protective layer | Tb | | | TbFe | | |
|---|---|---|---|---|---|---|
| | T/To | X-ray diffraction | Cracks | T/To | Cracks | Spots |
| Al₂O₃ | 1.95 | Tb + Tb₄O₇ | many | 1.11 | many | many*¹ |
| Al₂O₃—Ta₂O₅ (20:1) | 2.2 | | few | 2.3 | few | few*² |
| Al₂O₃—Ta₂O₅ (5:1) | 1.04 | Tb | very few | 1.10 | very few | none |
| Al₂O₃—Ta₂O₅ (1:2) | 2.0 | | few | 1.11 | very few | none |
| Ta₂O₅ | 1.79 | Tbo₁.₈₁ | many | 1.28 | very few | none |

(Note)
*¹The spots were observed after 50 hrs.
*²The spots were observed after 150 hrs.

In the next place, Specimen A was prepaed by laminating (1) the layer of Al₂O₃-Ta₂O₅(5:1) at a rate of 3 Å/sec in a thickness of 1100 Å, (2) the layer of TbFe at a rate of 5 Å/sec in a thickness of 500 Å and (3) the layer of Al₂O₃-Ta₂O₅(5:1) at a rate of 3 Å/sec in a thickness of 1100 Å on a PC base plate.

In the above-mentioned preparation of the medium, the generation of cracks and smear-like spot were not observed after keeping the specimen A for 3000 hours in a thermostat at 70° C. and 85% RH.

The change of the Kerr rotation angle ($\theta_k$) and the cohesive force ($H_c$) during the time or keeping at 70° C. and 85% RH is shown in FIG. 1.

At the same time, the other specimen B having structure of Ta₂O₅-SiO₂(1:1)/TbFe/Ta₂O₅-SiO₂(1:1)/PC base Plate was prepared and kept in the thermostat at 70° C. and 85% RH, however, the specimen B did not show Kerr histeresis within 100 hours (not shown in Figs.).

Figure 2:
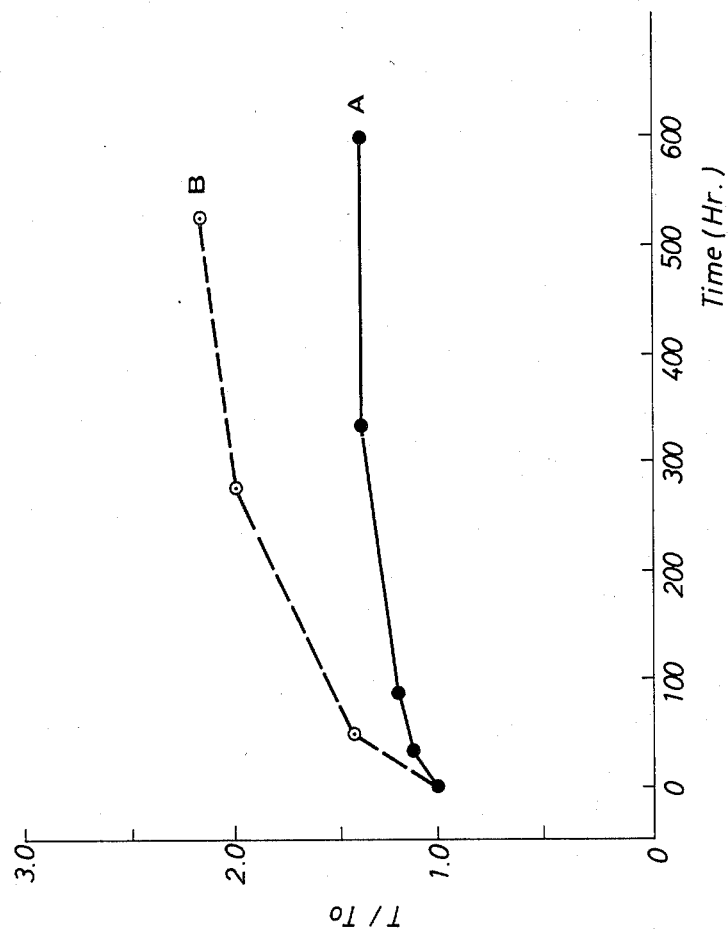
FIG. 2 shows the laser beam transmissivity of specimen A and specimen B.

The change of light transmissivity of the above-mentioned specimens A and B which did not show the Kerr histeresis is shown in FIG. 2, and the respective light transmissivity in the early stage (To, in %) is shown below.

TABLE 2

| Name of specimen | To (%) |
|---|---|
| A | 6 |
| B (Comparative) | 5.4 |

As are seen in the Table 2, the deterioration in the early stage can be evaluated.

EXAMPLE 2

A layer of TbFe amorphous alloy of a thickness of 1000 Å was formed by sputtering on a glass base plate and then a film of a complex oxide (Al₂O₃-Ta₂O₅) of a thickness of from 300 to 500 Å was further formed also by sputtering on the thus formed layer.

The layer of a complex oxide (Al₂O₃-Ta₂O₅) was prepared by the composed target of a predetermined amount of thin pellets (9 mm in diameter and 1 mm in thickness) of Ta₂O₅ on a Al₂O₃ target (10.16 cm in diameter) and applying 150 W of DC power under a pressure of $1 \times 10^{-2}$ Torr of pure gaseous argon.

Figure 3:
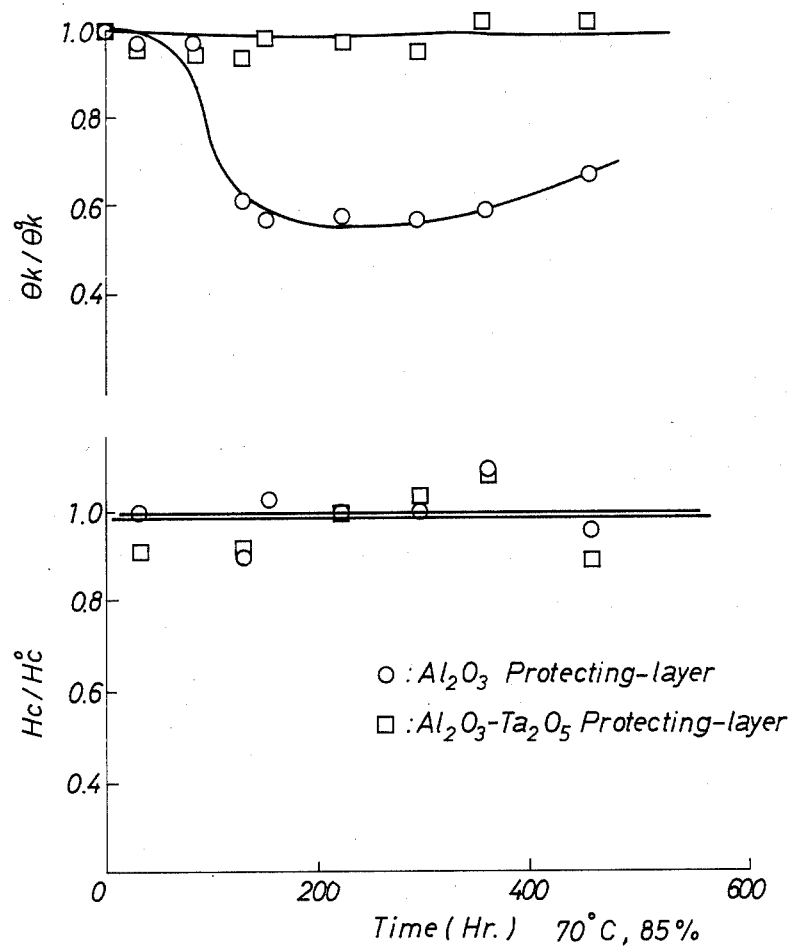

The thus prepared medium was kept in a thermostat at 70° C. and 85% RH, and was taken out regularly to measure the cohesive force ($H_c$) and the Kerr rotation angle ($\theta_k$) thereof to determine the change of these values with the passage of time, the results being shown in FIG. 3, wherein the regular square (□), and the circle (○) respectively show the results obtained on the $Al_2O_3$-$Ta_2O_5$ protective layer and the $Al_2O_3$ protective layer.

As are seen in FIG. 3, although the $Al_2O_3$ protective layer protected TbFe in the same extent as the $Al_2O_3$-$Ta_2O_5$ protective layer and showed a stabilized protective ability, the Kerr rotation angle ($\theta_k$) showed a reduction of not less than 40% after keeping the medium for about 100 hours at 70° C. and 85% RH. On examining the medium protected by the $Al_2O_3$ protective layer after about 100 hours at 70° C. and 85% RH by a reflecting optical microscope, it was found that smear-like spots of 50 to 100 μm in diameter were generated on the surface thereof. On the other hand, on examining the medium protected by the $Al_2O_3$-$Ta_2O_5$ protective layer, it was found that the state of the medium showed no change after more than 400 hours of the above-mentioned accelerating test.

EXAMPLE 3

In the same manner as in Example 1 except for using the protective layer shown in Table 3, four kinds of the media were prepared and subjected to the same tests as in Example 1, the results (after keeping each medium for about 1000 hrs at 70° C. and 85% RH) being also shown in Table 3.

EXAMPLE 4

In the same manner as in Example 1 except for using the protective layer shown in Table 4, three kinds of the media were prepared and subjected to the same tests as in Example 1, the results (after keeping each medium for about 1000 hrs at 70° C. and 85% RH) being shown also in Table 4.

TABLE 4

|  | Tb | | TbFe | | |
| --- | --- | --- | --- | --- | --- |
| Protective layer | Initial Transmissivity To (%) | Cracks | Initial Transmissivity To (%) | Cracks | Spots |
| $Al_2O_3$ | 4 | many | 7 | many | many |
| $Al_2O_3$—$TiO_2$ (2:1) | 38 | few | 10 | few | none |
| $Al_2O_3$—$TiO_2$ (1:2) | 17 | very few | 5 | very few | none |

EXAMPLE 5

In the same manner as in Example 1 except for using the protective layer shown in Table 5, 8 kinds of the media were prepared and subjected to the same tests as in Example 1, the results (after keeping each medium for about 1000 hrs. at 70° C. and 85% RH) being also shown in Table 5. However, T/To is a value after keeping each medium for about 2000 hrs at 70° C. and 85% RH. In Table 5, the trend of the oxidation of Tb layer is shown as the "Existence of Oxide". The existence of the oxidation of Tb indicates the grades of the protectivity of the protective layer.

TABLE 5

| | Tb | | | | | TbFe | | | Evaluation | |
| --- | --- | --- | --- | --- | --- | --- | --- | --- | --- | --- |
| Protective layer | Inital Transmissivity To (%) | T/To (%) | Existance of Oxide (X-ray diffraction) A*1 | B*2 | Cracks | Initial Transmissivity To (%) | Cracks | Spots | Reactivity | Stability & Adhesion |
| $Al_2O_3$ | 4 | 2.0 | none → | few | many | 7 | many | many | ○ | X |
| $Al_2O_3$—$Ta_2O_5$ (5:1) | 4 | 1.2 | none → | very few | 5 | few | none | | ◎ | ○ |
| $Al_2O_3$—$WO_3$ (5:1) | 11 | 1.4 | none → | very few | few | 6 | many | none | ○ | ○ |
| $Al_2O_3$—$Nb_2O_5$ (5:1) | 10 | 1.7 | none → | few | few | 6 | none | very few | ○ | ○ |
| $Al_2O_3$—$ZrO_2$ (5:1) | 20 | 0.84 | none → | very few | few | 9 | few | very few | Δ-○ | ○ |
| $Al_2O_3$—$TiO_2$ (1:2) | 17 | 2.0 | very few → | few | few | 5 | many | none | Δ | ○ |
| $Al_2O_3$—$SiO_2$ (20:1) | 8 | 1.8 | none → | few | many | 6 | few | few | Δ | Δ |
| $SiO_2$ | 25 | 2.7–3.2 | many → | many (mainly oxide) | many | 14 | none | none | X | ○ |

(Note)
*1(A) is a result immediately after producing the medium.
*2(B) is a result after keeping the medium for 1000 hrs. at 70° C. and 85% RH.

TABLE 3

|  | Tb | | TbFe | | |
| --- | --- | --- | --- | --- | --- |
| Protective layer | Initial Transmissivity To (%) | Cracks | Initial Transmissivity To (%) | Cracks | Spots |
| $Al_2O_3$ | 4 | many | 7 | many | many |
| $Al_2O_3$—$SiO_2$ (20:1) | 8 | few | 6 | few | few |
| $Al_2O_3$—$SiO_2$ (3:2) | 8 | none | 10 | none | few |
| $SiO_2$ | 25 | none | 14 | none | none |

EXAMPLE 6

In the same manner as in Example 2 except for using polycarbonate base plate (thickness: 1.2 mm) and sputtering apparatus (TOKUDA Manufacturing Co., Ltd., CFS-8EP), the magneto-optical medium (DISK) comprising base plate/protective layer/magnetic layer/protective layer was produced, the protective layer being $Al_2O_3$-$Ta_2O_5$(5:1) of thickness of 700 Å and the magnetic layer being Tb-Fe-Co (24:68:8) of the thickness of 900 Å.

The thus obtained magneto-optical medium was kept in a thermostat at 65° C. and 80% RH, the deterioration with the passage of time of the thus obtained magneto-optical medium was measured by Read/Write evaluation machine (manufactured by Nakamichi Co., Ltd., OMS-5000).

The change of record/play back characteristics (ratio of C/N) was evaluated under the condition of the carrier frequency of 0.5 MHz, the writting laser power of 3.3 mW, disc peripheral speed of 2 m/sec and the reading laser power of 0.8 mW. After immidiately producing the disc, C/N ratio was 40 dB and after 200 hrs, 900 hrs, 1200 hrs and 2400 hrs, each C/N ratio was measured and as a result no change of each of C/N ratio was observed, respectively.

What is claimed is:

1. A magneto-optical medium comprising a magnetic layer, a protective layer of a binary mixed oxide comprising aluminum oxide and one oxide selected from the group consisting of tantalum oxide, niobium oxide, titanium oxide, zirconium oxide and tungsten oxide, and a base plate, wherein the respective content of tantalum oxide and niobium oxide is 3 to 80 mol%, the respective content of titanium oxide and zirconium oxide is 20 to 95 mol% and the contents of tungsten oxide is 5 to 80 mol% based on said mixed oxide.

2. A magneto-optical medium according to claim 1, wherein the thickness of said protective layer is 10 to 5000 Å.

3. A magneto-optical medium according to claim 1, wherein said protective layer is disposed between the magnetic layer and the base plate.

4. A magneto-optical medium according to claim 1, wherein said mixed oxide comprises aluminum oxide and one oxide selected from the group consisting of tantalum oxide, tungsten oxide, niobium oxide and zirconium oxide.

5. A magneto-optical medium according to claim 4, wherein said mixed oxide comprises aluminum oxide and tantalum oxide.

6. A magneto-optical medium according to claim 1, wherein said magnetic layer is disposed between the protective layer and the base plate.

7. A magneto-optical medium according to claim 6, wherein a protective layer is further disposed between the base layer and the magnetic layer.

* * * * *

UNITED STATES PATENT AND TRADEMARK OFFICE
CERTIFICATE OF CORRECTION

PATENT NO. : 4,743,502

DATED : May 10, 1988

INVENTOR(S) : YOSHITOMI ET AL

It is certified that error appears in the above-identified patent and that said Letters Patent is hereby corrected as shown below:

```
Column 3, line 36, delete "titanium" and insert
--tantalum--.
```

Signed and Sealed this

Seventh Day of February, 1989

*Attest:*

DONALD J. QUIGG

*Attesting Officer*     *Commissioner of Patents and Trademarks*